United States Patent
Zou et al.

(10) Patent No.: US 10,157,498 B2
(45) Date of Patent: Dec. 18, 2018

(54) SYSTEM AND METHOD FOR PROCEDURALLY GENERATED OBJECT DISTRIBUTION IN REGIONS OF A THREE-DIMENSIONAL VIRTUAL ENVIRONMENT

(71) Applicant: Robert Bosch GmbH, Stuttgart (DE)

(72) Inventors: Lincan Zou, San Jose, CA (US); Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 125 days.

(21) Appl. No.: 15/240,296

(22) Filed: Aug. 18, 2016

(65) Prior Publication Data

US 2018/0053345 A1    Feb. 22, 2018

(51) Int. Cl.
*G06T 17/10*    (2006.01)
*G06T 11/00*    (2006.01)
(Continued)

(52) U.S. Cl.
CPC ............ *G06T 17/10* (2013.01); *G06T 11/001* (2013.01); *G06T 15/005* (2013.01); *G06T 17/00* (2013.01);
(Continued)

(58) Field of Classification Search
CPC ... G06F 3/0482; G06F 3/04842; G06Q 30/02; H04W 4/02; G06T 17/10; G06T 11/001;
(Continued)

(56) References Cited

U.S. PATENT DOCUMENTS 8,130,245 B2 *  3/2012  Ham ................. G06F 17/30902
                                           340/995.15
8,224,355 B2 *  7/2012  Beydler ............... G01S 5/0027
                                           455/456.5
(Continued)

OTHER PUBLICATIONS

Qu H, Wang H, Cui W, Wu Y, Chan MY. Focus+ context route zooming and information overlay in 3D urban environments. IEEE Transactions on Visualization and Computer Graphics. Nov. 2009;15(6):1547-54.*
(Continued)

*Primary Examiner* — Xilin Guo
(74) *Attorney, Agent, or Firm* — Maginot Moore & Beck LLP (57) ABSTRACT

A system and method of procedural generation of graphics includes generating a bounding polygon corresponding to a size and shape of a region within a three-dimensional virtual environment that includes the plurality of objects, aligning, with the processor the bounding polygon with a two-dimensional arrangement of tiles that include predetermined locations corresponding to the objects, identifying object locations within the bounding polygon based on the data corresponding to the predetermined plurality of locations within the tiles, each object location corresponding to one predetermined location in one tile in the plurality of tiles that lies within the bounding polygon, and generating, with the processor and a display device, a graphical depiction of the three-dimensional virtual environment including graphical depictions of the plurality of objects positioned in the plurality of object locations within the bounding polygon in the region.

18 Claims, 9 Drawing Sheets

(51) Int. Cl.
*G06T 17/00* (2006.01)
*G06T 15/00* (2011.01)
*G06T 19/00* (2011.01)

(52) U.S. Cl.
CPC ........ *G06T 19/006* (2013.01); *G06T 2210/12* (2013.01); *G06T 2210/61* (2013.01)

(58) Field of Classification Search
CPC ..... G06T 15/005; G06T 17/00; G06T 19/006; G06T 2210/12; G06T 2210/61
USPC .......................................................... 345/418
See application file for complete search history.

(56) References Cited

U.S. PATENT DOCUMENTS

| | | | |
|---|---|---|---|
| 8,724,914 B2* | 5/2014 | Inada | G06T 11/00 382/173 |
| 9,400,591 B2* | 7/2016 | Sheha | G06Q 30/02 |
| 2005/0171754 A1 | 8/2005 | Santodomingo et al. | |

OTHER PUBLICATIONS

Semmo A, Trapp M, Kyprianidis JE, Döllner J. Interactive visualization of generalized virtual 3D city models using level-of-abstraction transitions. InComputer Graphics Forum Jun. 1, 2012 (vol. 31, No. 3pt1, pp. 885-894). Blackwell Publishing Ltd.*

Isola P, Liu C. Scene collaging: Analysis and synthesis of natural images with semantic layers. In Proceedings of the IEEE International Conference on Computer Vision 2013 (pp. 3048-3055).*

Tung F, Little JJ. Collageparsing: Nonparametric scene parsing by adaptive overlapping windows. InEuropean Conference on Computer Vision Sep. 6, 2014 (pp. 511-525). Springer, Cham.*

International Serach Report corresponding to International Patent Application No. PCT/EP2017/069894 (8 pages).

Mantler, Stephan et al., "Interactive Landscape Visualization Using GPU Ray Casting", Proceedings of the 4th International Conference on Computer Graphics and Interactive Techniques in Australasia and Southeast Asia, Graphite 2006, Jan. 1, 2006 (11 pages).

Cohen, Michael F. et al., "Wang Tiles for Image and Texture Generation", ACM Transactions on Graphics (TOG), ACM, vol. 22, No. 3, Jul. 1, 2003 (8 pages).

Lefebvre, Sylvain et al., "Pattern Based Procedural Textures", Proceedings on Symposium on Interactive 3D Graphics, New York, NY, Apr. 27, 2003 (11 pages).

Bruneton, Eric et al., "Real-Time Rendering and Editing of Vector-based Terrains", Computer Graphics, vol. 27, No. 2, Blackwell Publishing, 2008 (10 pages).

Wei, Li-Yi, "Tile-Based Texture Mapping on Graphics Hardware", Proceedings of the ACM SIGGRAPH/Eurographics conference on Graphics Hardware, HWWS 2004, ACM Press, New York, NY, 2004 (10 pages).

Bruneton, Eric et al., "Real-time Realistic Rendering and Lighting of Forests", Computer Graphics Forum, vol. 31, No. 2 pt1, May 1, 2012 (11 pages).

Suter, M. et al., "Automated Generation of Visual Simulation Databases Using Remote Sensing and GIS", Proceedings on IEEE Conference on Visualization, 1995, Atlanta, GA (8 pages).

* cited by examiner

SYSTEM AND METHOD FOR PROCEDURALLY GENERATED OBJECT DISTRIBUTION IN REGIONS OF A THREE-DIMENSIONAL VIRTUAL ENVIRONMENT

FIELD

This disclosure relates generally to the field of computer graphics and, more specifically, to systems and methods for procedural generation of objects in three-dimensional computer graphics.

BACKGROUND

Many modern software applications display three-dimensional representations of objects and scenes as part of a user interface. Three-dimensional (3D) graphics are used in a wide range of applications including video games, simulations, virtual and augmented reality applications, geospatial information applications, and applications for mapping and navigation. In many applications, 3D graphics are more useful than two-dimensional (2D) graphics at depicting real-world environments and locations because the normal interaction between humans and the real-world occurs in three dimensions.

To display three-dimensional graphics, the computing system requires geometry information for structures and other items in the three-dimensional virtual environment along with various other pieces of data including textures and lighting information to perform the processing to produce a graphical depiction of the virtual environment. In some instances, a large number of comparatively small graphical models, such as trees, are displayed within the virtual environment. Storing individual graphical models for a large number of trees or other small objects is often impractical, so some prior art systems employ various techniques for procedural generation to display groups of multiple trees using a comparatively small set of geometric data that can be stored in memory in a practical manner. Procedurally generated graphics refer to graphics, including 3D graphics, which a computing device generates using a comparatively small set of stored graphics data including models and textures and one or more computational algorithms to construct complex graphical scenes from the stored graphics data. For example, generating a large forest using a small set of graphical models that represent a few individual trees is a common application of procedurally generated graphics.

While procedurally generated graphics reduce the requirements for complex pre-generated graphical models for a virtual environment, the prior art procedural generation techniques also require more computational power to perform the algorithms that are required to generate the virtual environment and generate the graphics for a large number of objects, often numbering in the thousands of objects or more, in a scene. While powerful graphics hardware that is commercially available can perform these algorithms, many embedded and lower-power computing devices cannot perform the prior art procedural generation techniques at acceptable performance levels. Consequently, improved techniques for procedural generation of graphics for large numbers of objects in a computationally efficient manner would be beneficial.

SUMMARY

In one embodiment, a method for generating graphics corresponding to a plurality of objects in a three-dimensional virtual environment has been developed. The method includes generating, with the processor, a bounding polygon corresponding to a size and shape of a region within a three-dimensional virtual environment that includes the plurality of objects, retrieving, with the processor, a plurality of tiles from a memory, each tile including data corresponding to a predetermined plurality of locations for the plurality of objects distributed in the tile, aligning, with the processor the bounding polygon with a two-dimensional arrangement of the plurality of tiles, identifying, with the processor, a plurality of object locations within the bounding polygon based on the data corresponding to the predetermined plurality of locations within the tiles, each object location corresponding to one predetermined location in one tile in the plurality of tiles that lies within the bounding polygon, and generating, with the processor and a display device, a graphical depiction of the three-dimensional virtual environment including graphical depictions of the plurality of objects positioned in the plurality of object locations within the bounding polygon in the region.

In another embodiment, a graphics display system that generates graphical representations of a three-dimensional virtual environment. The system includes a display device configured to generate a graphical display of the three-dimensional virtual environment, a memory configured to store graphical data corresponding to the three-dimensional virtual environment and a plurality of objects and a plurality of tiles, each tile including data corresponding to a predetermined plurality of locations for the plurality of objects distributed in each tile, and a processor operatively connected to the display device and the memory. The processor is configured to generate a bounding polygon corresponding to a size and shape of a region within the three-dimensional virtual environment that includes the plurality of objects, retrieve a plurality of tiles from a memory, each tile including data corresponding to a predetermined plurality of locations for the plurality of objects distributed in the tile, align the bounding polygon with a two-dimensional arrangement of the plurality of tiles, identify a plurality of object locations within the bounding polygon based on the data corresponding to the predetermined plurality of locations within the tiles, each object location corresponding to one predetermined location in one tile in the plurality of tiles that lies within the bounding polygon, and generate a graphical depiction of the three-dimensional virtual environment including graphical depictions of the plurality of objects positioned in the plurality of object locations within the bounding polygon in the region with the display device.

DETAILED DESCRIPTION

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the terms "three-dimensional (3D) virtual environment" or more simply "virtual environment" refer to a set of geometric, texture, and other graphical data that are stored in a memory of a computer system to enable the computer system to generate a graphical depiction of a space with three visually perceivable dimensions, which are often projected onto a two-dimensional video display device or can be displayed using a three-dimensional viewing device. While not a requirement, many three-dimensional virtual environments represent geographical regions on Earth including graphical representations of land, water, the sky, lighting, and other environmental effects that provide a visual representation of the environment on Earth. The virtual environment data include topographic information such as the elevation and inclines of land features, locations of water, as well as other geographic features. Artificial structures such as buildings, roads, bridges, and the like can be depicted within the three-dimensional virtual environments. Additionally, the three-dimensional virtual environment often includes regions that correspond to natural objects, such as trees in a forest. As described in further detail below, the computer systems taught herein generate graphical depictions of the three-dimensional virtual environment that include regions with trees or other objects that are generated with a template-based procedural generation process.

As used herein, the term "object" refers to data that correspond to a two-dimensional image sprite or a three-dimensional group of polygons in a virtual environment that form a model of a single object in the larger virtual environment. For example, in many virtual environments for mapping and navigation applications, graphical objects that depict trees are one type of object that is distributed over forested regions of land in the three-dimensional virtual environment. The term "sprite" refers to a two-dimensional graphical object that is positioned within a three-dimensional virtual environment with one side of the sprite being oriented toward a viewing frustum to produce a graphical effect that is similar to viewing a cardboard cutout with a two-dimensional picture of a three-dimensional object.

At least some objects in a 3D virtual environment extend from the virtual representation of the ground. The polygons or sprites that define each object provide a graphical representation for the object with an expected orientation relative to the surface of the ground in the 3D virtual environment.

Figure 1:
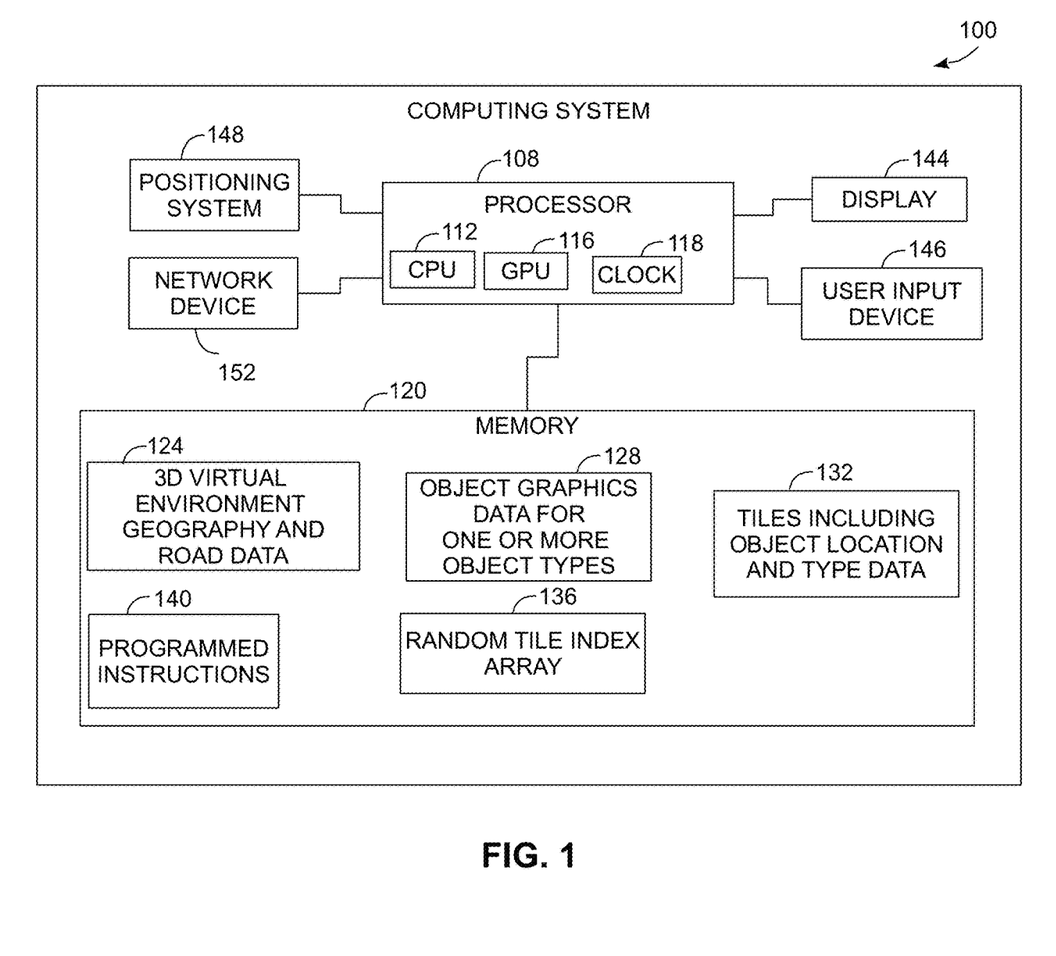
FIG. 1 is a schematic diagram of a computing device that is configured to generate three-dimensional (3D) graphics including procedurally generated objects, such as trees, over selected regions of a 3D virtual environment.

FIG. 1 depicts a graphics display system 100 that generates graphical representations of a three-dimensional virtual environment. Non-limiting examples of the system 100 include in-vehicle navigation systems, mobile electronic devices such as smartphones, tablets, or wearable computing devices, and other embedded computing systems that generate graphical depictions of three-dimensional virtual environments. FIG. 1 depicts a computing system 100 that generates a graphical display of a 3D virtual environment including a representation of ground, such as the surface of the Earth, with ground lighting and wall lighting textures applied to the regions surrounding the structures and to the polygons that depict walls of the structures. The computing system 100 includes a processor 108, memory 120, display 144, user input devices 146, optional positioning system 148, and optional network device 152. Hardware embodiments of the computing system 100 include, but are not limited to, personal computer (PC) hardware, embedded system hardware including embedded computing hardware for use in a motor vehicle, and mobile electronic devices including smartphone and tablet computing devices.

In the computing system 100, the processor 108 includes one or more integrated circuits that implement the functionality of a central processing unit (CPU) 112, a graphics processing unit (GPU) 116, and a clock 118. In some embodiments, the processor is a system on a chip (SoC) that integrates the functionality of the CPU 112 and GPU 116, and optionally other components including the memory 120, network device 152, and positioning system 148, into a single integrated device. In one embodiment, the CPU 112 is a commercially available central processing device that implements an instruction set such as one of the x86, ARM, Power, or MIPs instruction set families. The GPU includes hardware and software for display of both 2D and 3D graphics. In one embodiment, processor 108 executes software drivers and includes hardware functionality in the GPU 116 to generate 3D graphics using a version of the OpenGL, OpenGL ES, Vulkan, Metal, or Direct3D graphics application programming interfaces (APIs). For example, the GPU 116 includes one or more hardware execution units that implement vertex shaders and fragment shaders for the processing and display of 2D and 3D graphics. During operation, the CPU 112 and GPU 116 execute stored programmed instructions 140 that are retrieved from the memory 120. In one embodiment, the stored programmed instructions 140 include operating system software and one or more software application programs that generate 3D graphics, including mapping and navigation applications, virtual reality applications, game applications, simulation applications, and any other software that is configured to generate 3D graphics. The processor 108 executes the mapping and navigation program and generates 2D and 3D graphical output corresponding to maps and map features through the display device 144. The processor is configured with software and hardware functionality by storing programmed instructions in one or memory devices that are operatively connected to the processor and by operatively connecting the hardware functionality to the processor and/ or other electronic, electromechanical, or mechanical components to provide data from sensors or data sources to enable the processor to implement the processes and system embodiments discussed below.

In the processor 108, the clock 118 is a timing device that maintains a time value using a predetermined format (e.g. seconds since the epoch) that the system 100 can use for various purposes including identifying the time of year in the physical environment that is external to the system 100 using a calendar software program. In some embodiments the system 100 periodically sets the clock 118 based on data received via the network device 152 from external time servers using, for example, the network time protocol (NTP) or from timing data received from external transmitters via the positioning system 148.

The memory 120 includes both non-volatile memory and volatile memory. The non-volatile memory includes solid-state memory devices, such as NAND flash memory, magnetic and optical storage media, or any other suitable data storage device that retains data when the in-vehicle information system 100 is deactivated or loses electrical power. The volatile memory includes static and dynamic random access memory (RAM) that stores software and data, including graphics data and map feature data, during operation of the in-vehicle information system 100. In addition to the programmed instructions 140, the memory 120 includes 3D virtual environment data 124, graphics models for one or more types of objects 128, data corresponding to a plurality of tiles 132 that include predetermined locations for the objects, and a random tile index array 136. The 3D virtual environment data 124 includes a model of a virtual environment include ground terrain information, roads that extend through regions of the terrain, and structures that are not procedurally generated, such as unique landmarks within the 3D virtual environment. The 3D virtual environment data include vertices with three-dimensional coordinates that define a series of interconnected polygons, such as triangles, that form the shape of various features within the 3D virtual environment.

In the memory 120, the object graphics data 128 includes two-dimensional sprites or three-dimensional geometric models for one or more types of objects that the system 100 places in a region of the 3D virtual environment using the procedural graphics generation processes that are described herein. For example, in one configuration the object graphics data includes a set of graphical models for different graphical representations of trees that the system 100 generates in forested regions of the 3D virtual environment. Each graphical model for an object is associated with an object type that is encoded in the tile data 132 to enable the system 100 to generate graphics for multiple types of objects, such as different sets of graphics for different types of trees. Additionally, in some embodiments the object graphics data 128 stores multiple sets of graphics for the objects to depict the same objects under different environmental conditions, such as one set of graphics for trees in the summer with another set of graphics for the same trees in the autumn.

In the memory 120, the tile data 132 includes a plurality of "tiles" that each represent a two-dimensional region that includes a predetermined distribution of locations that correspond to potential locations for an object to be generated in a graphical depiction of the 3D virtual environment. Each location in the tile includes encoded type data, such as a numeric value or other suitable data value that specifies one type of object stored in the object graphics data 128 to be generated at the particular location in the tile. In one embodiment the tiles 132 are stored as two-dimensional bitmap data while in other embodiments the tiles are stored as sparse matrices. As described in more detail below, the memory 120 stores a comparatively small set of tiles and the system 100 generates two-dimensional arrangements that often include repeated sets of tiles. The random tile index array 136 includes a numeric array that is generated in a random or pseudo-random manner and stored in the memory 120 to control the ordering of the arrangement of tiles during the operation of the system 100. The random tile index array data 136 enables the system 100 to generate arrangements of tiles that provide an appearance of randomness in the generated graphics but that can be regenerated by the system 100 in a deterministic manner to enable the system 100 to generate the same set of procedurally generated object graphics in a consistent manner at different times of operation.

The computing system 100 includes an optional network device 152 that is configured to send and receive data from external computing systems through a data network (not shown). Examples of the network device 152 include wired network adapters such as Ethernet and universal serial bus (USB) adapters, and wireless network adapters such as 3G or 4G wireless wide area network (WWAN), 802.11 or Bluetooth wireless local area network (WLAN) adapters. In some embodiments, the processor 108 retrieves virtual environment data 124, structure model polygon data 128, and texture data 132 from an external network for storage in the memory 120. In some embodiments, the memory 120 caches the graphics data and the processor 108 stores additional graphical data that is received through the network device 152 to update the contents of the memory 120.

The computing system 100 includes an optional positioning system device 148 that is operatively connected to the processor 108. Examples of positioning systems include global positioning system (GPS) receivers, radio triangulation receivers that identify a location of the computing system 100 with respect to fixed wireless transmitters, and inertial navigation systems. During operation, the processor 108 executes mapping and navigation software applications that retrieve location information from the positioning system 148 to identify a geographic location of the computing system 100 and to adjust the display of the virtual environment to correspond to the location of the computing system 100. In navigation applications, the processor 108 identifies the location and movement of the computing system 100 for the generation of routes to selected destinations and display of the routes in the 3D virtual environment.

In the computing system 100, the display 144 is either an integrated display device, such as an LCD or other display device, which is integrated with a housing of the computing system 100, or the display 144 is an external display device that is operatively connected to the computing system 100 through a wired or wireless interface to receive output signals from the processor 108 to generate a display of the 3D virtual environment. In an embodiment where the computing system 100 is an in-vehicle embedded computing device, the display 144 is an LCD or other flat panel display that is located in the console of a vehicle, or the display 144 is a head-up display (HUD) or other projection display that displays the 3D virtual environment on a windshield or other display surface in the vehicle.

Figure 2:
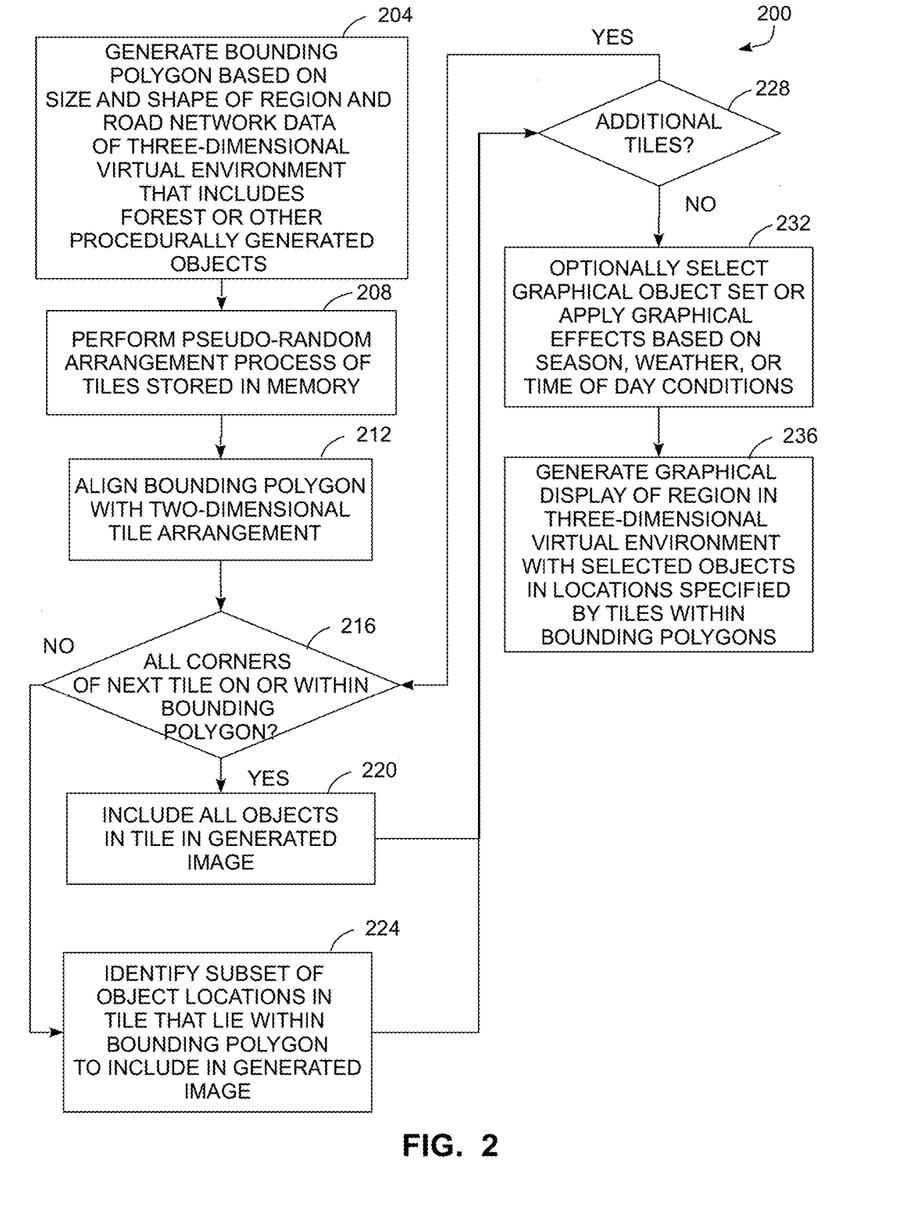
FIG. 2 is a block diagram of a process for procedural generation and display of trees and other objects in a 3D virtual environment.

FIG. 2 depicts a process 200 for the generation of graphics for a 3D virtual environment including procedurally generated graphics for objects within predetermined regions of the 3D virtual environment. In the discussion below, a reference to the process 200 performing a function or action refers to an operation of a processor to execute stored program instructions to perform the function or action in association with other components in a graphics display system. The process 200 is described in conjunction with the system 100 of FIG. 1 and the depictions of FIG. 4 and FIG. 6-FIG. 9 for illustrative purposes.

Process 200 begins as the system 100 identifies a bounding polygon based on a size and shape of a region that includes a plurality of objects, such as a forest formed from procedurally generated tree objects (block 204). For example, topographic or other geographic data in the 3D virtual environment data 124 specify that a geographic region of the 3D virtual environment is forested. In some embodiments, the forested region may correspond to a park or forest preserve that is demarcated in geographic data within the 3D virtual environment data 124. In other embodiments, the forested region may be identified based on aerial photographic data of a particular geographic region that is either stored in the memory 120 or used to identify predetermined forested regions in the virtual environment data 124 prior to commencement of the process 200.

The bounding polygon is a two-dimensional polygon that represents the outside boundary of the region that surrounds the region and has a two-dimensional form that corresponds to the size and shape of the region at a predetermined scale from an overhead view that is similar to a two-dimensional map view of the region. In a 3D virtual environment, the variations in the height of the land under the region do not affect the bounding polygon. The system 100 generates the object graphics are generated on the surface of the region based on the height of the geometric data for the land or other base surface in the 3D virtual environment data 124 for each object location. The bounding polygon forms a border for the procedurally generated objects that can lie within the bounding polygon but are not located outside of the bounding polygon area.

Figure 4:
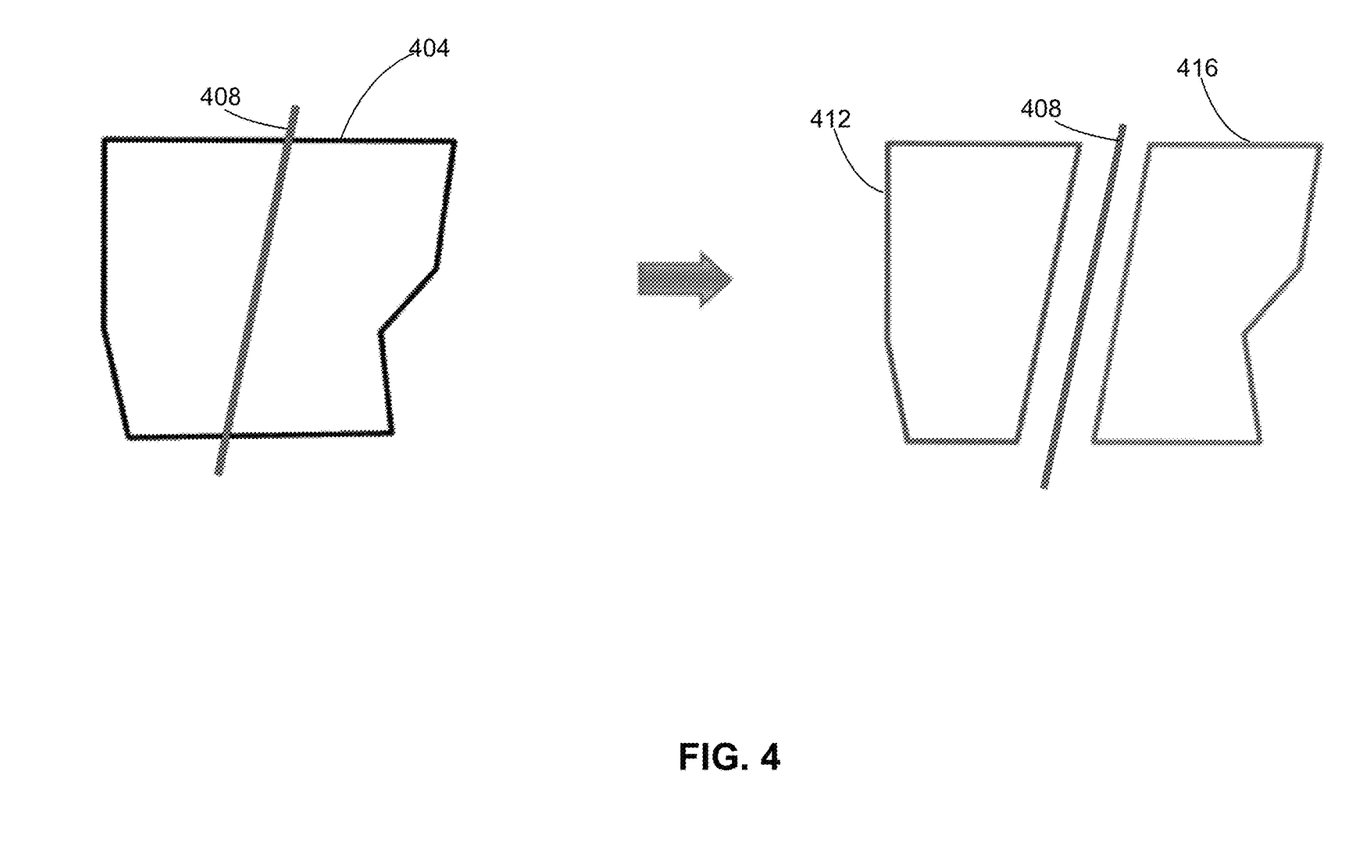
FIG. 4 is a diagram depicting bounding polygons that surround regions of a three-dimensional virtual environment that include objects.

During the process 200, the system optionally road network data for roads that extend through the predetermined region and lie within a bounding polygon that surrounds the region. The graphical representations for the roads are within the region and the procedurally generated objects within the bounding polygon could be placed at locations over the roads. However, placing objects, such as trees, over roads is both inaccurate in most situations and can obscure the roads, which are important visual elements in various applications including navigation applications. During process 200, the processor 108 identifies the locations of one or more roads in the region and generates the bounding polygon including at least one side of the bounding polygon that borders the road to exclude the road from the bounding polygon to ensure that the procedurally generated objects are not located on the road. FIG. 4 depicts an example of a bounding polygon 404 that surrounds a predetermined region including the road 408 that extends through the region. During process 200, the processor 108 splits the region along the road 408 to generate two new bounding polygons 412 and 416. Each of the bounding polygons includes at least one side that runs in parallel to the road 408 to exclude the road 408 from both of the bounding polygons 412 and 416. During process 200, the processor 108 generates graphics for the procedurally generated objects within both of the bounding polygons for the sub-regions 412 and 416, but avoids placing the procedurally generated objects on the road 408.

Figure 6:
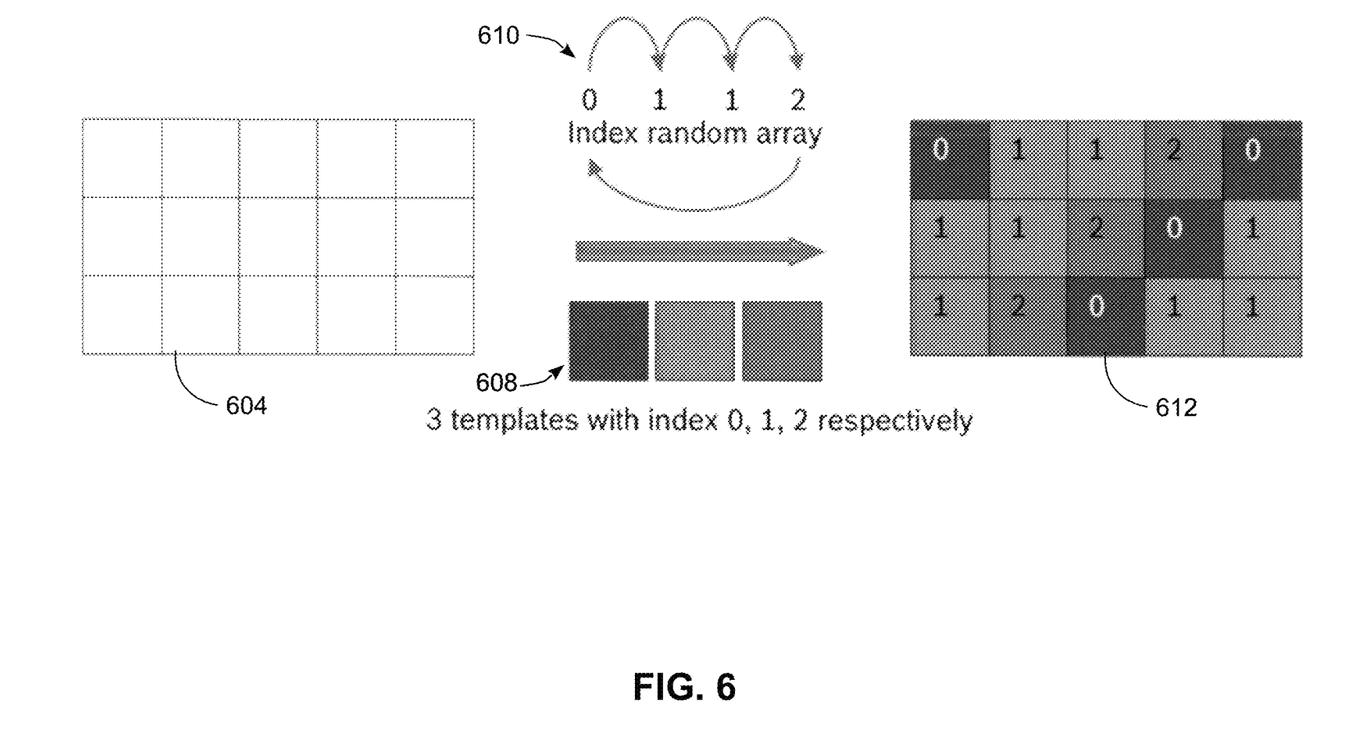
FIG. 6 is a diagram depicting a two-dimensional arrangement of different tiles using a randomized index to produce a pseudo-random tile arrangement.

Referring again to FIG. 2, during process 200 the processor 108 retrieves the plurality of tiles from the tile data 132 in the memory 120 and generates a two-dimensional arrangement of the tiles using a pseudo-random ordering process to provide the appearance of a natural and non-repeating set of procedurally generated objects in a manner that can be reproduced deterministically (block 208). In the system 100, the processor 108 uses the pseudo-random tile index array data 136 to generate a numeric sequence for the tiles that produces a two-dimensional arrangement of tiles that appears random to an observer but can be repeated in a deterministic manner by the processor 108. Larger arrangements of tiles typically repeat the same tile multiple times, and the processor 108 repeats sequences of the tiles in the pseudo-random order to generate a two-dimensional arrangement of the tiles with sufficient size to fully encompass a bounding polygon. FIG. 6 depicts a two-dimensional array of tiles 604 in a system that includes three different predetermined tiles 608, where each tile is associated with a numeric index value (e.g. 0, 1, and 2). The processor 108 uses a pseudo-random index array 610 to select the next tile for the tile array and positions the tiles in a predetermined sequence, such as filling each row of tiles and then continuing in the next row to produce the tile array 612. The arrangement of the tiles in the array 612 provides an appearance of randomness in the generated graphics, but the system 100 can reproduce the tile array 612 in a deterministic manner, which enables the system 100 to generate a consistent set of procedurally generated objects in a region of the 3D virtual environment as the same region of the 3D virtual environment is displayed at different times during operation of the system 100.

Figure 7:
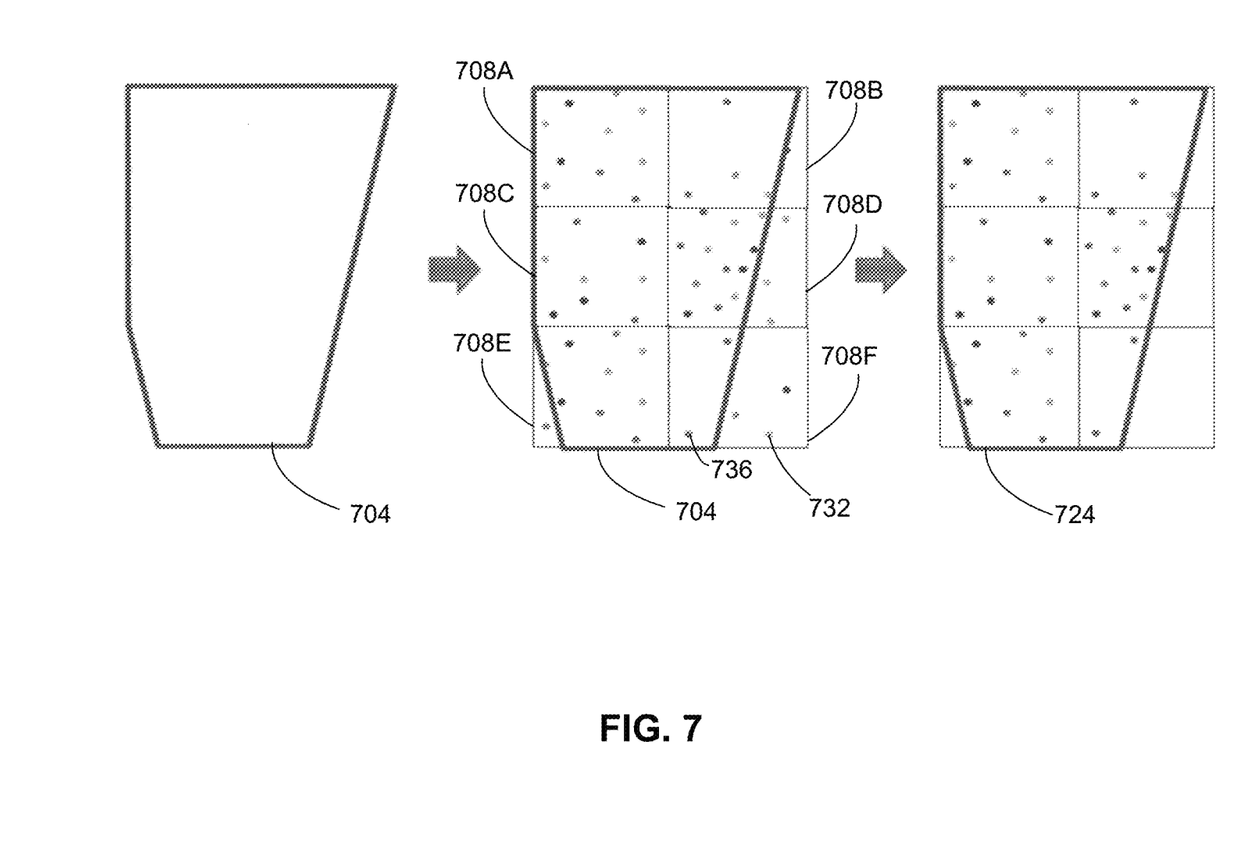
FIG. 7 is a diagram depicting a bounding polygon being aligned with a two-dimensional arrangement of tiles.

The process 200 continues as the processor 108 aligns the bounding polygon with the two-dimensional arrangement of the plurality of tiles (block 212). Referring to FIG. 7, the processor 108 positions the bounding polygon 704 over the two-dimensional arrangement of the tiles 708A-708F. In the illustrative embodiment of FIG. 7, the upper left-hand corner of the bounding polygon is aligned with the upper left-hand corner of the tile array at tile 708. More broadly, an alignment process includes at least one relative reference location that is aligned with another reference location in the two-dimensional arrangement of tiles, such as the upper-left corner. In some situations, the processor 108 rotates the bounding polygon 704 about the reference location to enable the entire bounding polygon to be positioned over the tiles. Most bounding polygons representing geographic regions can be aligned over a two-dimensional arrangement of tiles with minimal processing. For example, convex bounding polygons are typically suitable for alignment with the tiles in a relatively simple manner while concave polygons may be difficult to align with the tiles. In some configurations, the processor 108 subdivides concave bounding polygons into two or more simpler convex polygons that can be aligned with the array of tiles in a predetermined manner. For example, a minimum bounding box could be calculated from the convex polygon or concave polygon. The minimum bounding box could be used to align with the tiles.

The process 200 continues as the processor 108 identifies a plurality of object locations within the bounding polygon based on the data corresponding to the predetermined plurality of locations within the tiles, where each object location corresponding to one predetermined location in one tile in the plurality of tiles that lies within the bounding polygon. While each tile includes a predetermined arrangement of a plurality of locations that may correspond to an object, the processor 108 only identifies object locations that are both within the bounding polygon 704 and within one of the tiles 708A-708F. For example, in FIG. 7 the bounding polygon 704 covers all or a portion of each of the tiles 708A-708F. However, some of the locations within the tiles that the bounding polygon 704 only partially overlaps are outside of the bounding polygon, such as the location 732. The location 732 is part of the tile 708F, but does not form an object location, such as the object location 736 that is both within the bounding polygon 704 and the tile 708F.

To identify the object locations in an efficient manner, the processor 108 first identifies if all corners of a tile lie within the bounding polygon (block 216). For example, in FIG. 7 the tiles each have four corners and the processor 108 identifies if each of the four corners lies within the bounding polygon 704 using, for example, ray casting, winding number, or other techniques that are known to the art. Tile corners that lie directly on the edge of the bounding polygon are considered to be within the bounding polygon in the process 200. If all corners of the tile lie within the bounding polygon (block 216), then the processor 108 includes each location within the tile as an object location within the bounding polygon without having to perform any additional processing of the individual tile locations (block 220). For example, the tile 708A has four corners that all lie within the bounding polygon 704. The processor 108 includes all of the locations within the tile 708A as object locations without requiring any additional processing to determine if the individual tile locations lie within the boundary polygon.

During the process 200, if at least one corner of a tile lies outside of the bounding polygon (block 216), then the processor 108 identifies a subset of the locations within the tile that also lie within the bounding polygon as object locations (block 224). The processor 108 performs the same process that is applied to the corners of the tile to the locations within the tile to identify if individual locations within the partially overlapping tile are within the boundary polygon or outside the boundary polygon. Only the subset of locations within each tile that also lie within the boundary polygon correspond to object locations that the system 100 uses to generate object graphics in the three-dimensional virtual environment. In some embodiments, the processor 108 optimizes the search process by subdividing the tile into smaller segments (e.g. four quarter tiles), identifying the quarters of the tile that lie completely within the bounding polygon, and including all of the locations within the quarters that are completely within the bounding polygon. In a regularly shaped tile such as a quadrilateral tile, determining if a location lies within a regularly shaped segment (e.g. a square) is typically a much simpler computational process for the processor 108 compared to the more sophisticated processes for identifying if a location lies within a more irregularly shaped bounding polygon. The subdivision process can be more efficient for tiles that include a large number of locations rather than identifying if each individual location lies within the bounding polygon. For large tiles, the processor 108 optionally performs the subdivision process multiple times to determine if smaller sub-segments of the tile lie completely within the bounding polygon.

Figure 9:
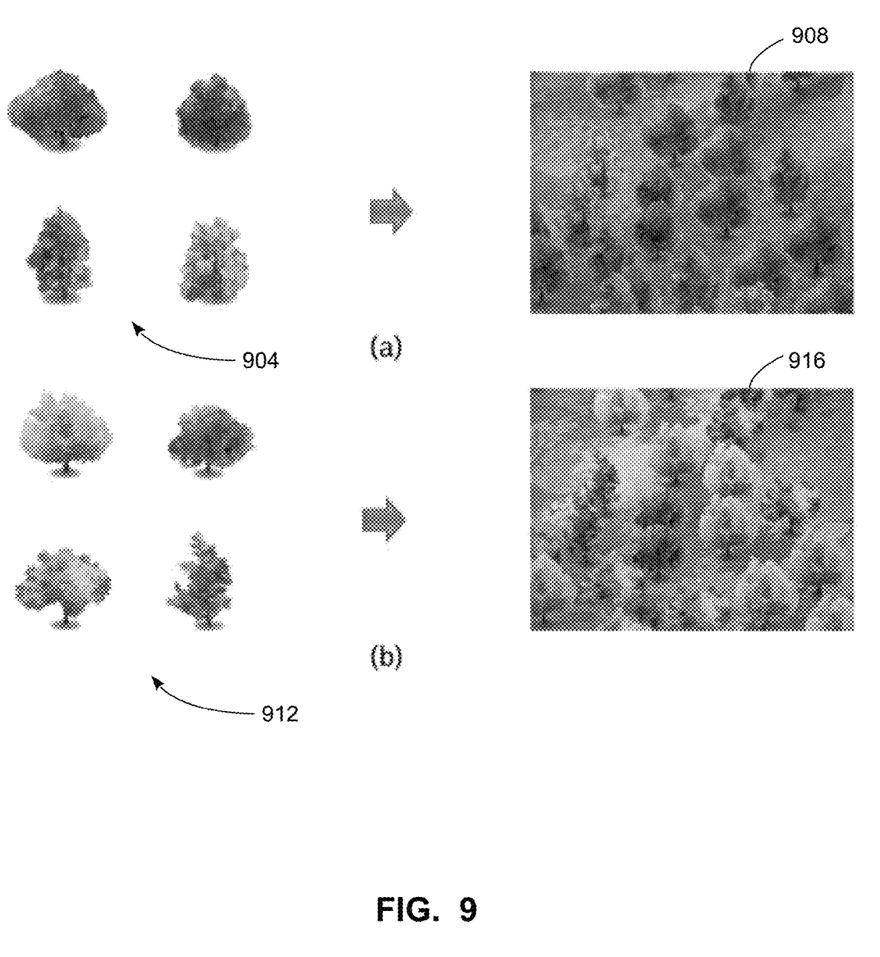
FIG. 9 is an illustrative depiction of graphical models for different types of objects that are included in a graphical depiction of a three-dimensional virtual environment.

The process 200 continues with the processing described above with reference to blocks 216-224 for any additional tiles that are aligned with the bounding polygon (block 228). Once all of the tiles have been processed, the processor 108 uses the object locations within the bounding polygon, such as the bounding polygon 724, to generate graphics for the objects in the 3D virtual environment at the locations in the region corresponding to the bounding polygon. In some embodiments, the processor 108 uses the clock 118 to identify the date and a corresponding time of year, such as winter, spring, summer, or autumn. The processor 108 then selects a set of graphical objects 128 from the memory 120 to use for generation of the objects within the region based on the identified time of year or other geographic and environmental factors that affect the selection of graphical data to display the objects in the three-dimensional virtual environment (block 232). For example, FIG. 9 depicts a first set of graphical objects 904 that correspond to trees in the spring and summer months and a partial display of the trees 908. In FIG. 9, a second set of object graphics 912 corresponds to the trees in the autumn and the display 916 depicts the autumn tree objects in the 3D virtual environment. Both the sets of graphical objects 904 and 912 include multiple graphical models, such as four tree models for each set depicted in FIG. 9, that correspond to type code data at each object location within the bounding polygon. During the graphical rendering process, the processor 108 selects the object model corresponding to each type of object for the corresponding object location to generate graphics of the three-dimensional virtual environment that include different types of the object, such as different types of trees in FIG. 9.

In further embodiments, the memory 120 stores object graphics data 128 for different seasons, times of day, and optionally different weather conditions. The processor 108 optionally retrieves a set of graphical objects 128 from the memory 120 based on the season to enable the system 100 to generate graphics that have a higher likelihood of reflecting the appearance of the physical environment that is external to the system 100. For example, when incorporated in an in-vehicle navigation system, the seasonal object graphics depict the surroundings of the vehicle at different times of the year.

While FIG. 9 depicts two different sets of graphical objects 904 and 912 that depict trees at different times of the year, in another embodiment the system 100 selects different programmable shaders, such as fragment shaders, that adjust the appearance of a single set of graphical models that represent the trees. The GPU 116 in the processor 108 executes the shader programs to change the appearance of the models for the objects during the graphical rendering process that is described below. For example, in one configuration different shaders adjust the colors of the tree models to reflect the different seasons.

Figure 8:
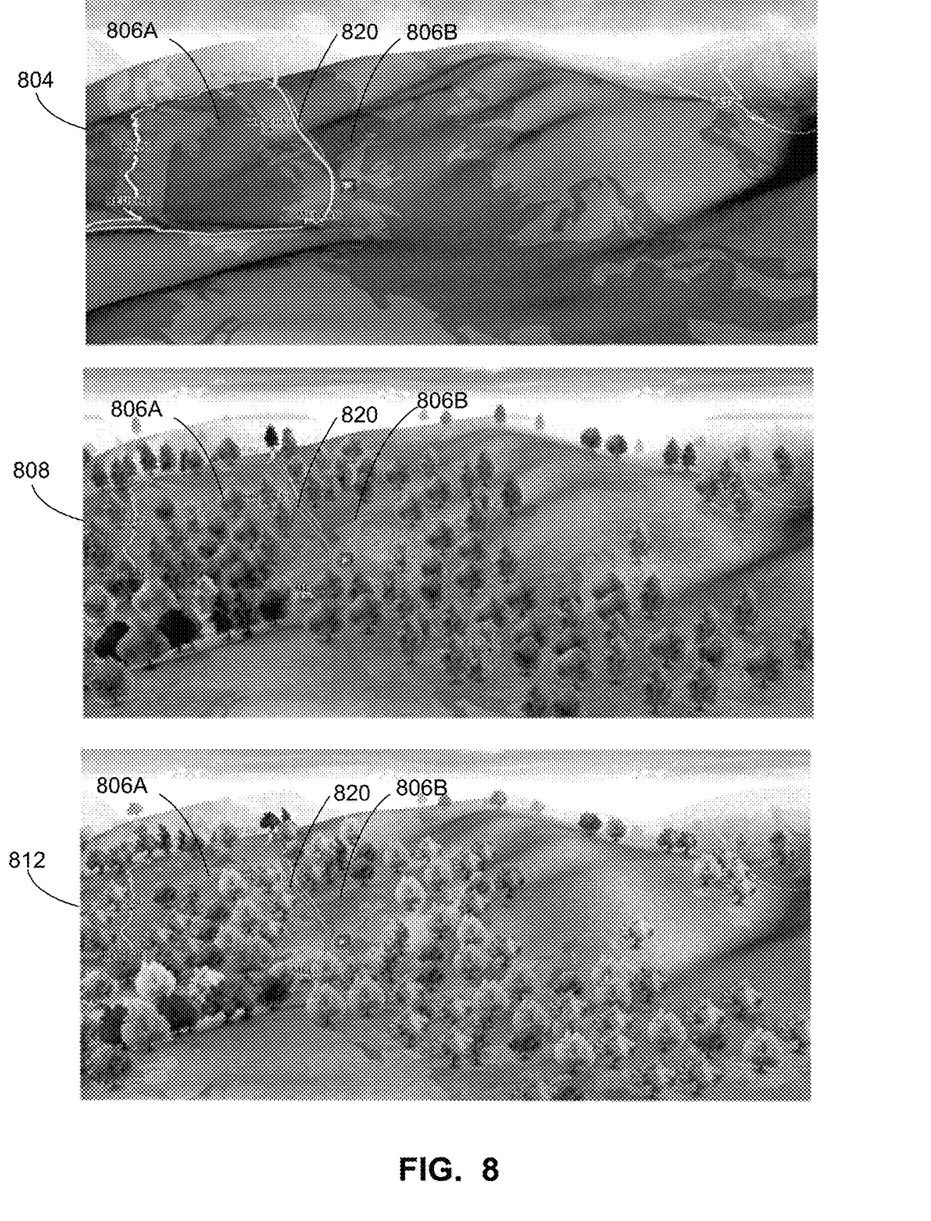
FIG. 8 is a set of illustrative depictions of a three-dimensional virtual environment both without objects and with a plurality of objects, such as trees, in predetermined regions of the virtual environment representing two different times of year.

Referring again to FIG. 2, the process 200 continues as the processor 108 generates a graphical depiction of the three-dimensional virtual environment including graphical depictions of the plurality of objects positioned in the plurality of object locations within the bounding polygon in the region (block 236). In the processor 108, the CPU 112 and GPU 116 process the 3D virtual environment data to generate a graphical display of land and other features within the 3D virtual environment using the display 144. The processor 108 also uses the retrieved object graphics models to enable the GPU 116 to generate a graphical depiction of different object types at the object locations specified in the bounding polygon. FIG. 8 depicts a first display 804 of land in the 3D virtual environment with a road 820 and a predetermined region around the road including sections 806A and 806B that contain trees. In the display 808, the GPU 116 in the processor 108 generates graphical depictions of trees in the regions 806A and 806B. The road 820 remains clear of trees because the processor 108 generates the bounding polygons with sides that exclude road 820 within the region. A third display 812 includes the trees at the same locations of the display 808 but using graphical object models or shader effects to display the 3D virtual environment and the tree models during the autumn season instead of during spring or summer as depicted in the display 808.

The process 200 enables the system 100 to generate a graphical display of the 3D virtual environment including a large number of procedurally generated trees or other objects with reduced computational requirements for placing the procedurally generated objects within different regions of the 3D virtual environment. In some embodiments, the bounding polygon that includes object locations within the bounding polygon, such as the polygon 724 of FIG. 7, can be cached to the memory 120 for predetermined regions of the 3D virtual environment that are displayed on a frequent basis to further reduce the computational requirements of the process 200.

Figure 3:
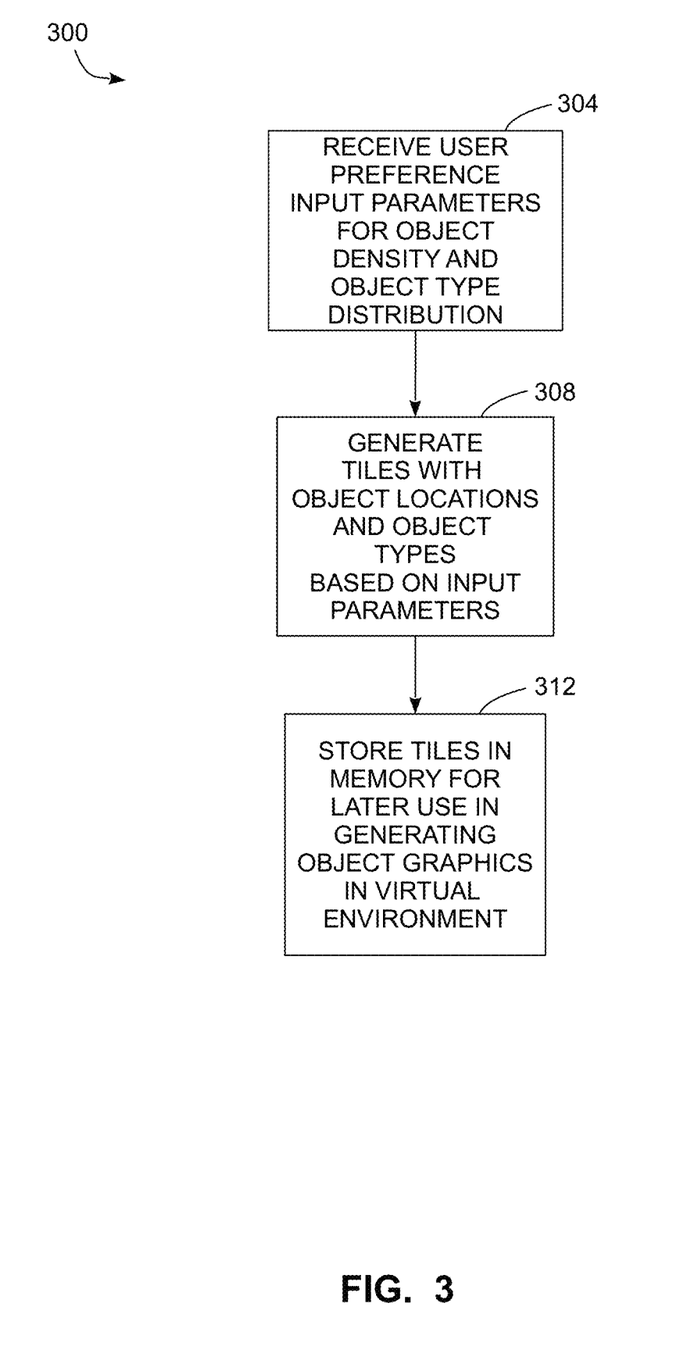
FIG. 3 is a block diagram of a process for generating tiles that are used in the process of FIG. 2 based on input parameters from a user.

As mentioned above, the system 100 retrieves a plurality of predetermined tiles 132 from the memory 120. In some embodiments, the system 100 receives user input via the user input device 146 to specify density and object type parameters to adjust the distribution of the object locations within each of the tiles. FIG. 3 depicts a process 300 for generating the tiles prior to the retrieval of the tile data 132 from the memory 120 during process 200. In the discussion below, a reference to the process 300 performing a function or action refers to an operation of a processor to execute stored program instructions to perform the function or action in association with other components in a graphics display system. The process 300 is described in conjunction with the system 100 of FIG. 1 and the depictions of FIG. 5 and FIG. 9 for illustrative purposes.

Figure 5:
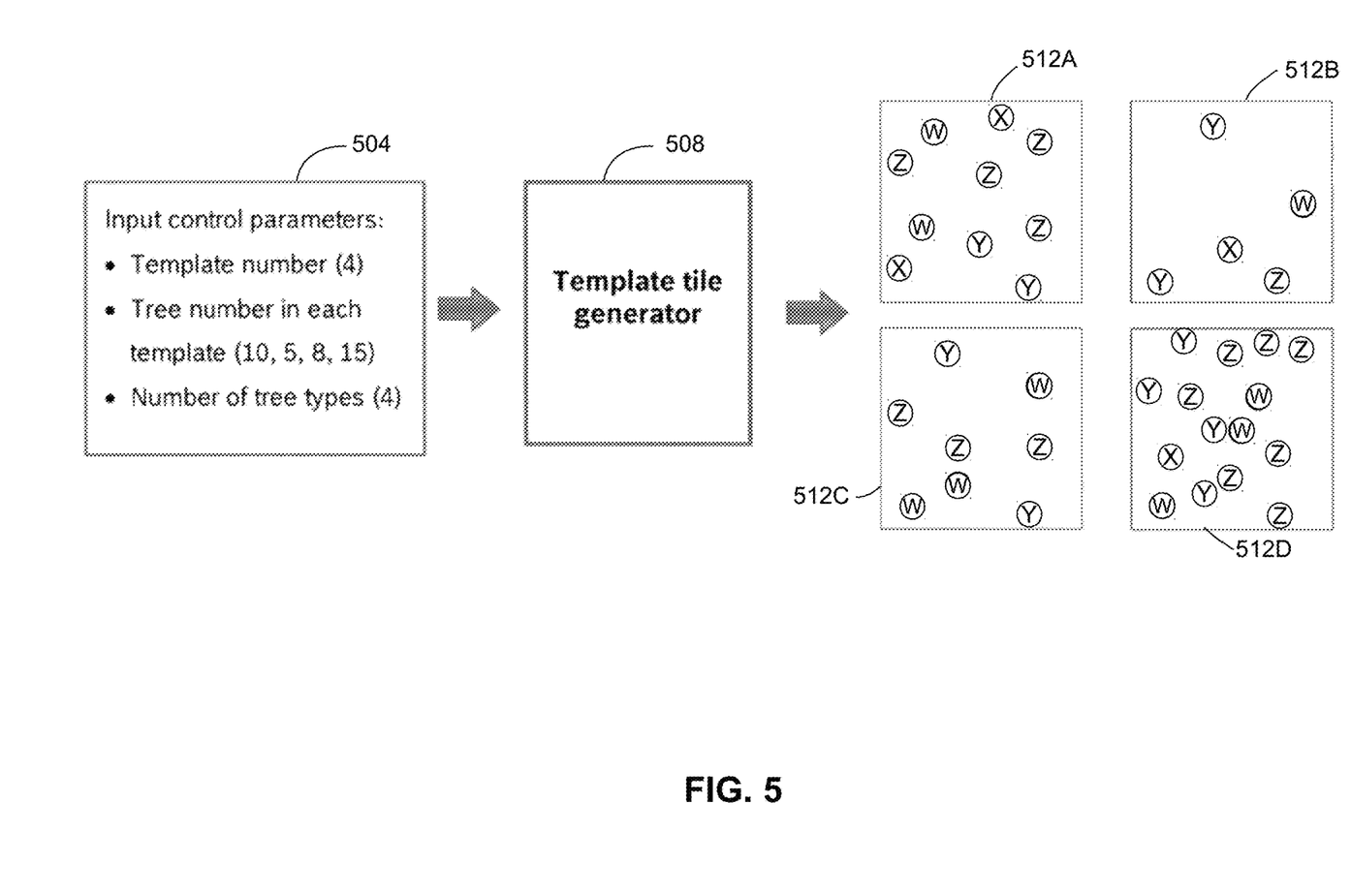
FIG. 5 is a depiction of an illustrative set of tiles that the system of FIG. 1 generates from user input parameters.

The process 300 begins as the system 100 receives user input from the user input device 146 that specifies one or more parameters such as a first input parameter that corresponds to a density of the plurality of objects within one or more tiles and a second input parameter that corresponds to a distribution of object types for the plurality of locations in each tile that correspond to an object (block 304). In the system 100, the user input device 146 receives input from a user specifying the input parameters to adjust the density, distribution, and types of objects that the system 100 displays in the three-dimensional virtual environment. In one embodiment, the user input device 146 is integrated with the display 144 to enable touch input from the user to specify the parameters using, for example, slider control elements that enable the user to input the parameters for object density, the types of objects that the system displays, and optionally other parameters such as the statistical distribution of the objects. FIG. 5 depicts an example of the input parameters 504 that identifies the number of tiles, number of objects (trees in the case of FIG. 5) for each tile in a set of four tiles that corresponds to the object density in each tile, and the number of tree types, which correspond to four different graphical objects to depict the four types of trees in the 3D virtual environment.

The process 300 continues as the processor 108 generates the tiles with object locations and encoded object types based on the input parameters (block 308). In FIG. 5 the block 508 represents hardware and software in the system 100 that generate the tiles, such as a software program that the processor 108 executes to generate the tiles. In the system 100, the processor 108 performs a random distribution process to generate the predetermined number of locations that correspond to objects in each of the four tiles 512A-512D of FIG. 5. In each tile, the processor 108 identifies locations that correspond to an object and encodes a type value for the object in embodiments where multiple types of objects, such as multiple graphical tree objects, are included in each tile. In some embodiments, the data corresponding to each tile are encoded as a sparse matrix or other space-efficient encoded data structure that represents the two-dimensional region of each tile and the locations and types of the objects in each tile. While the embodiments of tiles depicted herein include tiles with quadrilateral shapes, alternative embodiments use tiles with different shapes such as hexagons, triangles, or any other shape that is suitable for arrangement in a contiguous two-dimensional arrangement.

In the example of FIG. 5, the processor 108 generates the tiles with the locations of objects being distributed in each tile based on a random distribution, such as a uniform random distribution. However, in other configurations the distribution could follow a different statistical distribution (e.g. Gaussian, Poisson, etc.) or include a clustering or fractal growth process to distribute the objects, such as forming clumps of trees instead of a distribution of individual trees. Similarly, the processor 108 applies a statistical process to generate the type code identifier for each object, with the object locations in tiles 512A-512D being encoded as "W", "X", "Y", and "Z" to represent four different types of objects for illustrative purposes. The user input parameters optionally specify the different types of objects that should be generated in each tile and the relative frequency of each object type. As depicted in FIG. 9, each object type (e.g. W-Z in FIG. 5) corresponds to a graphical object model, such as one of the four tree models 904 that represent trees in the spring and summer or the four tree models 912 that represent the trees in autumn. As described above, the processor 108 retrieves a subset of the plurality of objects for the graphical models that correspond to a particular time of year from the object graphics data 128 in the memory 120 and generates the graphical models for the different object types based on the locations and object type identifiers in each tile.

The process 300 continues as the processor 108 stores the generated tile data in the memory for subsequent use in procedural generation of graphics for the objects within the three-dimensional virtual environment (block 312). In the system 100, the processor 108 stores the tiles with the tile data 132. The system 100 performs the process 300 on an offline manner or on a comparatively infrequent basis during periods when the processor 108 and other resources in the system 100 are not otherwise heavily utilized for 3D graphics generation or other processes. As described above in the process 200, the stored tile data 132 in the memory 120 enables efficient procedural generation of object graphics in the 3D virtual environment without requiring the processor 108 to perform the processing required to distribute the objects each time the system 100 generates graphics of the 3D virtual environment.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A method for generating graphics corresponding to a plurality of objects in a three-dimensional virtual environment comprising:
 generating, with the processor, a bounding polygon corresponding to a size and shape of a region within a three-dimensional virtual environment that includes the plurality of objects;
 retrieving, with the processor, a plurality of tiles from a memory, each tile including data corresponding to a predetermined plurality of locations for the plurality of objects distributed in the tile;
 arranging, with the processor, the plurality of tiles in a two-dimensional arrangement of non-overlapping tiles in a predetermined pseudo-random order with reference to a predetermined random index stored in the memory, the two-dimensional arrangement including a plurality of instances of at least one tile in the plurality of tiles;

aligning, with the processor, the bounding polygon with the two-dimensional arrangement of the plurality of tiles, the bounding polygon containing at least one entire tile in the plurality of tiles and only a portion of at least one other tile in the plurality of tiles;

identifying, with the processor, a plurality of object locations within the bounding polygon based on the data corresponding to the predetermined plurality of locations within the tiles, each object location corresponding to one predetermined location in one tile in the plurality of tiles that lies within the bounding polygon; and generating, with the processor and a display device, a graphical depiction of the three-dimensional virtual environment including graphical depictions of the plurality of objects positioned in the plurality of object locations within the bounding polygon in the region.

2. The method of claim 1, the identification of the plurality of object locations further comprising:

identifying, with the processor, a plurality of corner locations corresponding to each corner in a plurality of corners of the at least one entire tile in the plurality of tiles; and identifying, with the processor, the plurality of object locations including all of the predetermined plurality of locations within the at least one entire tile in response to each corner location of the at least one entire tile being within the bounding polygon.

3. The method of claim 1, the identification of the plurality of object locations further comprising:

identifying, with the processor, a plurality of corner locations corresponding to each corner in a plurality of corners of the at least one other tile in the plurality of tiles; and identifying, with the processor, the plurality of object locations including only a portion of the predetermined locations within the at least one other tile in response to at least one corner location of the at least one other tile being outside of the bounding polygon.

4. The method of claim 1, the generation of the graphical depiction of the plurality of objects in the three-dimensional virtual environment further comprising:

identifying, with a clock in the processor, a time of year of an external environment that corresponds to the three-dimensional virtual environment; and retrieving, with the processor, a subset of the plurality of objects that corresponds to the time of year from the memory.

5. The method of claim 1, the generation of the graphical depiction of the plurality of objects in the three-dimensional virtual environment further comprising:

retrieving, with the processor, a plurality of graphical objects corresponding to a plurality of trees; and generating, with the processor and the display device, the graphical depiction of the three-dimensional virtual environment including graphical depictions of the plurality of trees positioned in the plurality of object locations within the bounding polygon in the region.

6. The method of claim 1, the generation of the graphical depiction of the plurality of objects in the three-dimensional virtual environment further comprising:

identifying, with the processor, a first object type associated with a first object location in the plurality of object locations in one tile in the plurality of tiles; and generating, with the processor, the graphical depiction of the three-dimensional virtual environment including a graphical depiction of an object retrieved from the memory corresponding to the first object type in the first object location.

7. The method of claim 1, the generation of the bounding polygon further comprising:

identifying, with the processor, data corresponding to a road in the three-dimensional virtual environment extending through the predetermined region; and generating, with the processor, the bounding polygon including at least one side of the bounding polygon that borders the road to exclude the road from the bounding polygon.

8. The method of claim 1 further comprising:

receiving, with a user input device, a first input parameter corresponding to a density of the plurality of objects;

generating, with the processor, the plurality of tiles including a randomized distribution of locations that correspond to the plurality of objects in for each tile in the plurality of tiles based on the first input parameter; and storing, with the processor, the plurality of tiles in the memory prior to the retrieving of the plurality of tiles from the memory.

9. The method of claim 8 further comprising:

receiving, with a user input device, a second input parameter corresponding to a type distribution of the plurality of objects; and generating, with the processor, the plurality of tiles including a randomized distribution of object types for the plurality of locations in each tile in the plurality of tiles based on the second input parameter.

10. A graphics display system that generates graphical representations of a three-dimensional virtual environment comprising:

a display device configured to generate a graphical display of the three-dimensional virtual environment;

a memory configured to store:
graphical data corresponding to the three-dimensional virtual environment and a plurality of objects; and
a plurality of tiles, each tile including data corresponding to a predetermined plurality of locations for the plurality of objects distributed in each tile; and a processor operatively connected to the display device and the memory, the processor being configured to:

generate a bounding polygon corresponding to a size and shape of a region within the three-dimensional virtual environment that includes the plurality of objects;

retrieve a plurality of tiles from a memory, each tile including data corresponding to a predetermined plurality of locations for the plurality of objects distributed in the tile;

arrange the plurality of tiles in a two-dimensional arrangement of non-overlapping tiles in a predetermined pseudo-random order with reference to a predetermined random index stored in the memory, the two-dimensional arrangement including a plurality of instances of at least one tile in the plurality of tiles;

align the bounding polygon with the two-dimensional arrangement of the plurality of tiles, the bounding polygon containing at least one entire tile in the plurality of tiles and only a portion of at least one other tile in the plurality of tiles;

identify a plurality of object locations within the bounding polygon based on the data corresponding to the predetermined plurality of locations within the tiles, each object location corresponding to one predetermined location in one tile in the plurality of tiles that lies within the bounding polygon; and generate a graphical depiction of the three-dimensional virtual environment including graphical depictions of the plurality of objects positioned in the plurality of object locations within the bounding polygon in the region with the display device.

11. The system of claim 10, the processor being further configured to:

identify a plurality of corner locations corresponding to each corner in a plurality of corners of the at least one entire tile in the plurality of tiles; and identify the plurality of object locations including all of the predetermined plurality of locations within the at least one entire tile in response to each corner location of the at least one entire tile being within the bounding polygon.

12. The system of claim 10, the processor being further configured to:

identify a plurality of corner locations corresponding to each corner in a plurality of corners of the at least one other tile in the plurality of tiles; and identify the plurality of object locations including only a portion of the predetermined locations within the at least one other tile in response to at least one corner location of the at least one other tile being outside of the bounding polygon.

13. The system of claim 10 further comprising:

a clock; and the processor being operatively connected to the clock and further configured to:

identify a time of year of an external environment that corresponds to the three-dimensional virtual environment; and retrieve a subset of the plurality of objects that corresponds to the time of year from the memory.

14. The system of claim 10, the processor being further configured to:

retrieve a plurality of graphical objects corresponding to a plurality of trees; and generate, with the processor and the display device, the graphical depiction of the three-dimensional virtual environment including graphical depictions of the plurality of trees positioned in the plurality of object locations within the bounding polygon in the region.

15. The system of claim 10, the processor being further configured to:

identify a first object type associated with a first object location in the plurality of object locations in one tile in the plurality of tiles; and generate the graphical depiction of the three-dimensional virtual environment including a graphical depiction of an object retrieved from the memory corresponding to the first object type in the first object location.

16. The system of claim 10, the processor being further configured to:

identify data corresponding to a road in the three-dimensional virtual environment extending through the predetermined region; and generate the bounding polygon including at least one side of the bounding polygon that borders the road to exclude the road from the bounding polygon.

17. The system of claim 10, the processor being further configured to:

receive a first input parameter corresponding to a density of the plurality of objects;

generate the plurality of tiles including a randomized distribution of locations that correspond to the plurality of objects in for each tile in the plurality of tiles based on the first input parameter; and store the plurality of tiles in the memory prior to the retrieving of the plurality of tiles from the memory.

18. The system of claim 17, the processor being further configured to:

receive a second input parameter corresponding to a type distribution of the plurality of objects; and generate the plurality of tiles including a randomized distribution of object types for the plurality of locations in each tile in the plurality of tiles based on the second input parameter.

* * * * *